United States Patent [19]

Yamashita et al.

[11] 4,294,511
[45] Oct. 13, 1981

[54] CONNECTING OPTICAL SYSTEM FOR LIGHT GUIDES

[75] Inventors: Nobuo Yamashita, Tama; Miwako Maeda, Hino, both of Japan

[73] Assignee: Olympus Optical Co., Ltd., Tokyo, Japan

[21] Appl. No.: 55,035

[22] Filed: Jul. 5, 1979

[30] Foreign Application Priority Data

Jul. 10, 1978 [JP] Japan .................. 53-83825

[51] Int. Cl.³ .................................. G02B 5/16
[52] U.S. Cl. .................... 350/96.18; 350/480
[58] Field of Search ............... 350/96.18, 231

[56] References Cited

U.S. PATENT DOCUMENTS 3,912,364 10/1975 Hudson .............. 350/96.18
4,017,150 4/1977 Imai .................. 350/96.18
4,183,618 1/1980 Rush et al. ......... 350/96.18

FOREIGN PATENT DOCUMENTS 1017354 1/1966 United Kingdom ............ 350/96.18
1429843 3/1976 United Kingdom ............ 350/96.18

Primary Examiner—Stewart J. Levy
Attorney, Agent, or Firm—Cushman, Darby & Cushman

[57] ABSTRACT

An optical system for connecting a first light guide to a second light guide in such a manner that the rays emerging from said first light guide are incident on said second light guide. Said optical system is so adapted as to assure favorable angular distribution characteristic and plane luminous intensity distribution by arranging the emerging end surface of said first light guide in the vicinity of the front focal point of said optical system and the end surface of incidence of said second light guide in the vicinity of the rear focal point of said optical system respectively.

1 Claim, 14 Drawing Figures

CONNECTING OPTICAL SYSTEM FOR LIGHT GUIDES

BACKGROUND OF THE INVENTION (a) Field of the invention:

The present invention relates to a connecting optical system to be used for transmitting illumination light through endoscopes (especially non-flexible type) and, more specifically to a connecting optical system to be used especially when two light guides are used in mutually connected condition.

(b) Description of the prior art:

Light guides composed of optical fiber bundles or the similar material are used, for example, as illumination systems for endoscopes. In such an illumination system, a light guide 2 arranged on the side of a light source 1 is sometimes connected, at a point indicated by the reference numeral 5, to another light guide arranged on the object side in an endoscope as shown in FIG. 1. The reason to connect two light guides as shown in FIG. 1 is to eliminate operating inconvenience, i.e., disconnecting a long light guide from the light source and replacing it with another, for example, to replace several types of scopes during medical operation which may be required in case of an integral type of light guide consisting of a continuous section corresponding to both the light guide 2 arranged on the side of the light source and the light guide 4 arranged on the object side. In case of a dual-section type of light guide which consists of two light guides which are connected to each other, however, loss of light in the connecting system poses a problem.

When light is transmitted by using a light guide, loss of luminous intensity generally results from the fact that all the light falling on the end surface of incidence of the light guide is not transmitted since the core portion that allows the light to pass has a sectional area (effective sectional area) of 50 to 70% of the sectional area of the light guide. In case of the dual-section type of light guide mentioned above, loss of luminous intensity is more remarkable than that in the integral type of light guide and light is attenuated to 25% to 50% due to loss of luminous intensity in the connecting optical system. In an endoscope either of the integral or dual-section type, the section corresponding to the light guide 2 arranged on the side of the light source shown in FIG. 1 is prolonged for assuring convenient manipulation by the person who is being engaged in medical operation. When the light guide is long as described above, the angular distribution characteristic (ratio of luminous intensity of a ray incident at a given angle relative to that of a ray incident in parallel with the optical axis) of the light emerging from the light guide is degraded while it was passing through the light guide even if the characteristic is favorable before the light is incident onto the light guide from the light source. In case of the example illustrated in FIG. 1, the angular distribution characteristic of the light is degraded chiefly by the light guide 2 arranged on the side of the light source. As the conventional connecting optical system for light guides of endoscopes, there are known the direct connection type shown in FIG. 2 and another type shown in FIG. 3 in which the emerging end surface 2a of the light guide 2 arranged on the side of the light source is used as a secondary light source whose image is formed by a lens system 6 on the incident end surface 4a of the light guide 4 arranged on the object side.

Before discussing the angular distribution characteristics of these conventional types of connecting optical systems, angular distribution characteristic at the emerging end surface of the light guide 2 arranged on the side of the light source will be described. The angular distribution characteristic experimentally determined at the emerging end surface of the light guide 2 is represented by curve a shown in FIG. 5. This curve is similar to curve b also shown in FIG. 5 which is a quadratic curve of $I(\sin\theta) = -a\sin^2\theta + b$ wherein $\sin\theta$ is taken as a variable. When the emerging end surface of the light guide arranged on the side of the light source is used as the secondary light source, it is therefore possible to represent the angular distribution characteristic on said end surface in the form of a quadratic curve. Further, plane luminous intensity distribution in the radial direction ($2r_1$) of the light guide is uniform due to the characteristic of the light guide. Therefore, plane luminous intensity distribution and angular distribution characteristic in the radial direction of the secondary light source are as illustrated in FIG. 6A and FIG. 6B respectively.

In case of the dual-section type of light guide consisting of two light guides which are connected directly as shown in FIG. 2, the plane luminous intensity distribution and angular distribution characteristic on the light guide 4 arranged on the object side are the same as those of the secondary light source, and therefore as shown in FIG. 7A and FIG. 7B respectively.

Furthermore, in case of the light guide in which image of the secondary light source on the end surface of the light guide arranged on the side of the light source is formed on the incident end surface of the light guide arranged on the object side by using such a lens system as shown in FIG. 3, actually measured values of the light distribution characteristic are as represented by curve b illustrated in FIG. 10.

As is clear from these data, in the directly connected type light guide among the conventional types of light guides, the illumination light is incident onto the light guide arranged on the object side while keeping the plane luminous intensity distribution and angular distribution characteristic on the secondary light source. Therefore, the illumination light having angular distribution characteristic degraded by the long light guide is transmitted as it is, making it impossible to illuminate with favorable angular distribution characteristic. In case of the light guide in which an image of the secondary light source is projected by using the lens system shown in FIG. 3, the angular distribution characteristic is somewhat improved but is not sufficiently favorable as is judged from the curve b shown in FIG. 10.

SUMMARY OF THE INVENTION

A general object of the present invention is to provide an optical system for connecting a first light guide which is arranged on the side of the light source to a second light guide which receives the rays having been transmitted through said first light guide and emerged from said first light guide, transmit said rays and allows said rays to emerge from the other end for illuminating an object to be observed, said optical system being arranged between said first light guide and said second light guide, and being so adapted as to assure favorable plane luminous intensity distribution and angular distribution characteristic by positioning the emerging end surface of said first light guide and end surface of incidence of said second light guide in such a manner that each of said surfaces is nearer said optical system than the two points which are mutually conjugate of said lens system.

Prior to describing details of the present invention, plane luminous intensity distribution and angular distribution characteristic of the conventional connecting optical system exemplified in FIG. 3 will be discussed. In this type of connecting optical system, a sine condition of $\sin\theta/\sin\theta' = r'/r \equiv \beta$ (magnification) is satisfied when a ray emerging at an angle of $\theta$ from a point located at a distance of r (radius) as measured from the center on the emerging end surface of the light guide 2 arranged on the side of the light source is incident at an angle of $\theta'$ on a point located at a distance of r' (radius) on the end surface of incidence of the light guide 4 arranged on the object side. Therefore, the plane luminous distribution and angular distribution characteristic in this case are given by $r' = \beta r$ and $$\sin\theta' = \frac{\sin\theta}{\beta}$$

respectively. Speaking in short, the range of the plane luminous intensity distribution is multiplied by a factor of $\beta$. Further, ratio between the plane luminous intensity distribution on the secondary light source and that on the end surface of incidence of the light guide arranged on the object side is I $(r') = \pi\beta r_1^2/\pi(\beta r_1)^2 = 1/\beta^2$, and the luminous intensity on said end surface is multiplied by a factor $1/\beta^2$. Furthermore, the range of the angular distribution characteristic is multiplied by a factor of $1/\beta$. Assuming a case of $\beta = 1/\sqrt{2}$, luminous intensity is multiplied by a factor of 2, the range of the plane luminous intensity distribution is multiplied by a factor of $1/\sqrt{2}$ and the range of the angular distribution characteristic is multiplied by a factor of $\sqrt{2}$. These situations are illustrated in FIG. 8A and FIG. 8B.

In the connecting optical system in which an image of the secondary light source is projected onto the end surface of incidence of the light guide 4 arranged on the object side by arranging the optical system between the light guide 2 on the side of the light source and the light guide 4 on the object side, it is therefore possible to improve the angular distribution characteristic by selecting an adequate valve of $\beta$ in the lens system. When the range of the angular distribution characteristic is widened in this type of connecting optical system, luminous intensity is increased on the end surface of incidence of the light guide arranged on the object side. However, since the angular distribution characteristic curve for the end surface of the incidence of the light guide 4 has a shape which is similar to that of the angular distribution characteristic curve for the emerging end surface of the light guide 2 arranged on the side of the light source, the angular distribution characteristic is degraded while the rays are transferred through the light guide arranged on the object side, whereby the angular distribution characteristic of the rays which emerge from the light guide on the object side and illuminate the object to be observed cannot be improved sufficiently. In reality, the angular distribution characteristic of the rays is improved to such a degree as represented by the curve b shown in FIG. 10.

The present invention has been accomplished for correcting the above-described shortcoming, and succeeded in providing angular distribution characteristic more favorable than that of the conventional type of connecting optical system by selecting positional relationship between the end surfaces of both the light guides and the lens system which is different from that illustrated in FIG. 3.

DESCRIPTION OF THE PREFERRED EMBODIMENT

Figure 4:
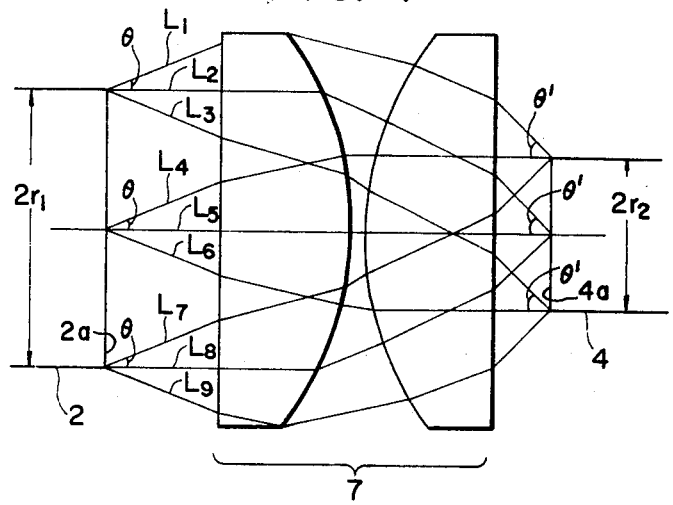
FIG. 4 shows a sectional view illustrating the composition of the connecting optical system for light guides according to the present invention.
Figure 5:
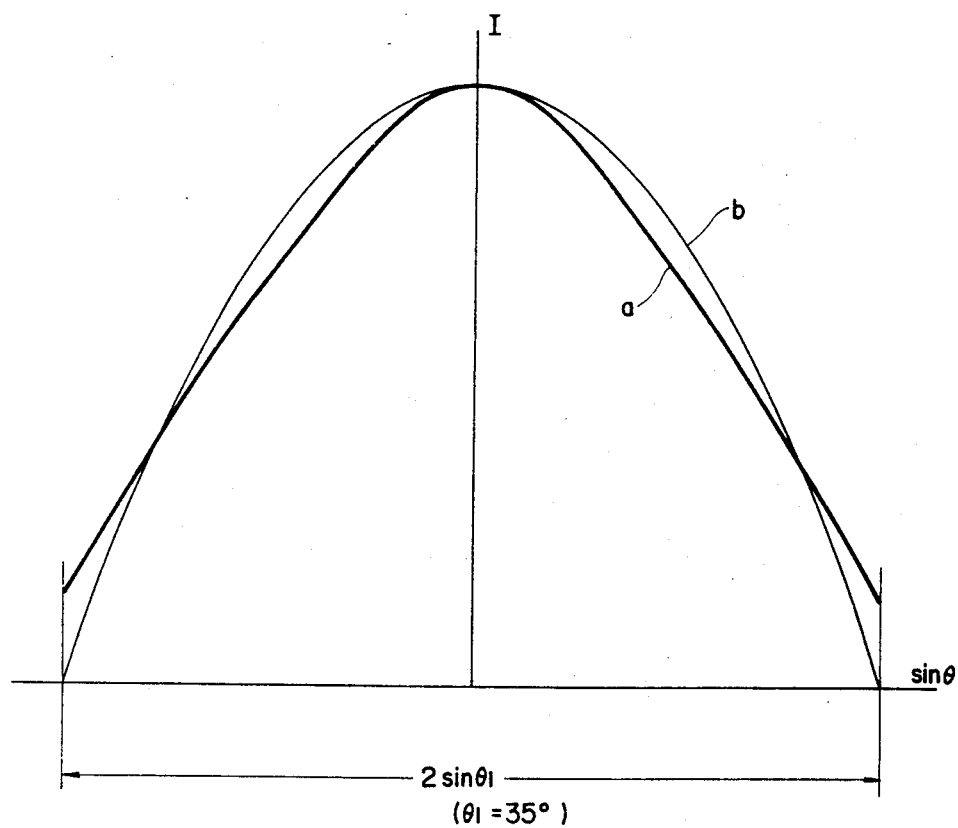
FIG. 5 shows curves illustrating the angular distribution characteristic of an illumination system using the conventional light guide.
Figure 6A:
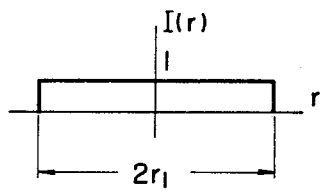
FIG. 6A shows a diagram illustrating the plane luminous intensity distribution on the emerging end surface of the light guide arranged on the side of the light source.
Figure 6B:
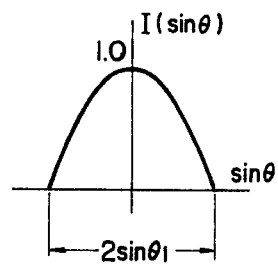
FIG. 6B shows a curve illustrating the angular distribution characteristic of said emerging end surface.

A preferred embodiment of the connecting optical system for light guides is shown in FIG. 4 wherein an end surface 2a of a light guide 2 on the side of the light source is arranged at or near the front focal point of a lens system 7 and an end surface 4a of a light guide 4 on the object side is positioned at or near the rear focal point of said lens system 7. In such an optical system, the following two relations are established:

$$f \sin\theta = r' \quad (1)$$

$$r = f \sin\theta' \quad (2)$$

wherein the reference symbols represent as defined below:

f: focal length of the lens system 7

θ: angle formed between the ray emerging from each fiber of the light guide on the light source side and the optical axis θ': angle formed between the ray incident on the light guide on the object side and the optical axis r and r': distances as measured from the center of the end surfaces of the respective light guides to given points on said end surfaces The relations mentioned above means that all the rays which emerge at an angle of θ from the light guide on the side of the light source are focused on the end surface of incidence of the light guide on the object side in FIG. 4. Speaking more concretely, rays $L_1$, $L_4$ and $L_7$ are focused on a point at $r_2$, rays $L_2$, $L_5$ and $L_8$ are focused on a point at 0, and rays $L_3$, $L_6$ and $L_9$ are focused at point at $-r_2$ respectively in FIG. 4. Further, rays emerging from the same point on the end surface of the light guide on the side of the light source are incident at an angle of θ' on the end surface of incidence of the light guide on the object side. Speaking concretely, the rays $L_1$, $L_2$ and $L_3$ are incident at an angle of $-\theta'$, the rays $L_4$, $L_5$ and $L_6$ at an angle of 0 degree, and the rays $L_7$, $L_8$ and $L_9$ at an angle of θ'.

Then, the following relation can be obtained from the formulae (1) and (2) mentioned above:

$$\sin\theta/\sin\theta' = r'/r = \beta' \quad (3)$$

When β' is considered as the term corresponding to β in the sine condition already decribed in this patent specification, the formula (3) mentioned above is quite the same as the sine condition. On the basis of this formula (3), range of the plane luminous intensity distribution on the end surface of incidence of the light guide on the object side used in this embodiment is r' = θ'r. Since the plane luminous intensity distribution on said end surface is obtainable by substituting sin θ with r' while maintaining plane luminous intensity distribution of I (sin θ) = −a sin² θ = b on the emerging end surface of the light guide on the side of the light source, the plane luminous intensity on the end surface of incidence of the light guide on the object side is:

$$I(r') = -ar'^2 + b$$

When $r' = \beta r_1$, we obtain:

$$(r') = -a\beta'^2 r_1^2 + b = 0 \quad (4)$$

Further, when quantity of light per unit area is taken as 1, the total quantity of light on the emerging end surface of the light guide on the side of the light source is $\pi r_1^2$ and, therefore, the total quantity of light on the end surface of incidence of the light guide on the object side is:

$$\int_0^{\beta' r_1} 2\pi r' I(r') dr' = \pi r_1^2 \quad (5)$$

From the formulae (4) and (5) shown above, we obtain:

$$a = \frac{2}{\beta'^4} \cdot \frac{1}{r_1^2}, \quad b = \frac{2}{\beta'^2}$$

$$\therefore I(r') = -\frac{2}{\beta'^4} \cdot \frac{1}{r_1^2} \cdot r'^2 + \frac{2}{\beta'^2}$$

Speaking of the angular distribution characteristic, the rays emerging from the same point on the emerging end surface of the light guide on the side of the light source are incident at the same angle on the end surface of incidence of the light guide on the object side. The range of the angular distribution characteristic is expressed as $\sin\theta' = 1/\beta' \sin\theta$.

When $\beta' = 1/\sqrt{2}$ is selected, for example, plane luminous intensity I is:

$$I(r') = -8/r_1^2 \cdot r'^2 + 4$$

Figure 7A:
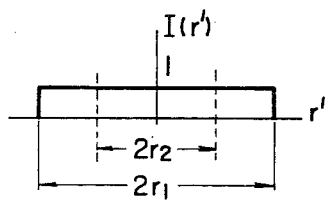
FIG. 7A shows a diagram illustrating the plane luminous intensity distribution on the end surface of incidence of the light guide arranged on the object side in the system shown in FIG. 2.
Figure 7B:
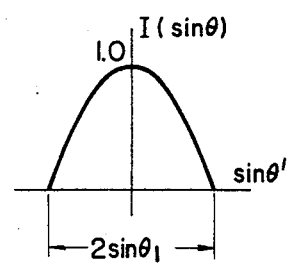
FIG. 7B shows a curve illustrating the angular distribution characteristic on said end surface of incidence.
Figure 8A:
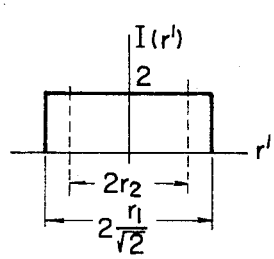
FIG. 8A shows a diagram illustrating the plane luminous intensity distribution on the end surface of incidence of the light guide arranged on the object side in the system shown in FIG. 3.
Figure 8B:
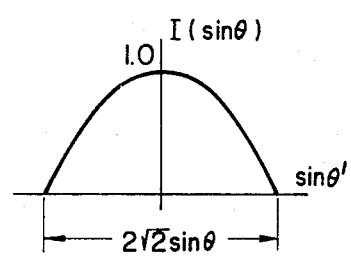
FIG. 8B shows a curve illustrating the angular distribution characteristic on said end surface of incidence.
Figure 9A:
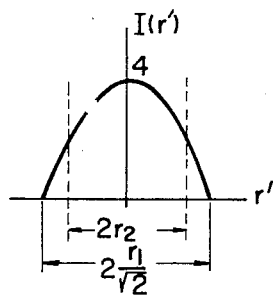
FIG. 9A shows a curve illustrating the plane luminous intensity distribution on the end surface of incidence of the light guide arranged on the object side in the optical system according to the present invention.
Figure 9B:
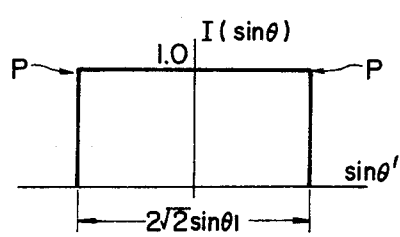
FIG. 9B shows a diagram illustrating the angular distribution characteristic on said end surface of incidence.

Range of the angular distribution characteristic is $1/\beta' \sin\theta = \sqrt{2}\sin\theta$. The plane luminous intensity distribution and angular distribution characteristics can be traced as the curve and diagram illustrated in FIG. 9A and FIG. 9B respectively. As is clear from these diagrams, the connecting optical system according to the present invention provides the plane luminous intensity distribution and angular distribution characteristic on the end surface of incident of the light guide on the object side which are remarkably improved as compared with those of the secondary light source on the end surface of the light guide on the side of the light source. When radius of end surface of the light guide on the object side is taken as 1, the light actually incident on the light guide on the object side is delimited as defined by the dashed lines in FIG. 7A, FIG. 8A and FIG. 9A within the ranges of the luminous intensities on said end surface. These luminous intensities are represented by $\frac{1}{4}\pi r_1^2$, $\frac{1}{2}\pi r_1^2$ and $\frac{3}{4}\pi r_1^2$ and at a ratio of 1:2:3. When the diameter of the light guide on the object side is made smaller than that of the light guide on the side of the light source, quantity of incident light remains unchanged in the conventional example as shown in FIG. 7A and FIG. 8A, whereas quantity of incident light increases in the connecting optical system according to the present invention as shown in FIG. 9A. Further, since the angular distribution characteristic is so flat as shown in FIG. 9B, the angular distribution characteristic of the rays emerging from the light guide on the object side and to be used for actual illumination is not degraded so much which they are still on the side of incidence of said light guide. Therefore, the connecting optical system according to the present invention makes it possible to illuminate an object to be observed at a sufficiently wide angle.

As is understood from the foregoing descriptions, the connecting optical system according to the present invention makes it possible to increase quantity of light incident on the light guide on the object side and provide ideally flat angular distribution characteristic of the rays incident on the light guide on the object side. The angular distribution on the emerging end surface of the light guide on the side of the light source has an angle of about 30° at $\frac{1}{4}$ of the peak intensity level. It is therefore impossible to obtain an angle larger than 30° in the conventional example in which light guides are connected directly. For an endoscope having a wide angle, however, an angle of incidence on the light guide on the object side must be larger than 30°. It is therefore necessary to select an angle larger than 30° as θ' used in $r = f\sin\theta'$ or $r/f = \sin\theta'$ in the formular (2). It is therefore preferable to establish the following relationship when radius of the light guide on the side of the light source is taken as $r_1$:

$$2r_1/f \leqq 1$$

Now, the numerical data for the embodiment of the present invention illustrated in FIG. 4 will be given below:

| | | | |
|---|---|---|---|
| $R_1 = \infty$ | | | |
| | $D_1 = 0.667$ | $N_1 = 1.8061$ | $V_1 = 40.9$ |
| $R_2 = -1.581$ | | | |
| | $D_2 = 0.076$ | | |
| $R_3 = 1.581$ | | | |
| | $D_3 = 0.667$ | $N_2 = 1.8061$ | $V_2 = 40.9$ |
| $R_4 = \infty$ | | | |
| | $f = 1$ | $S_1 = 0.591$ | $S_2 = 0.294$ |
| | $f_F = f_B = 0.592$ | $2r_1/f = 1.368$ | |
| | $r_2/r_1 = 0.38$ | $\sin\theta/\sin\theta' = 0.55$ | | wherein the reference symbols $R_1$ through $R_4$ represent radii of curvature on the surfaces of the respective lens components, the reference symbols $D_1$ through $D_3$ designate thicknesses of the respective lens components and airspace therebetween, the reference symbol f denotes total focal length of the lens system as a whole, the reference symbol $S_1$ represents distance as measured from the light guide on the side of the light source to the lens system, the reference symbol $S_2$ designates distance as measured from the lens system to the light guide on the object side, and the reference symbols $f_F$ and $f_B$ denote the front and rear focal points respectively of the lens system.

Figure 1:
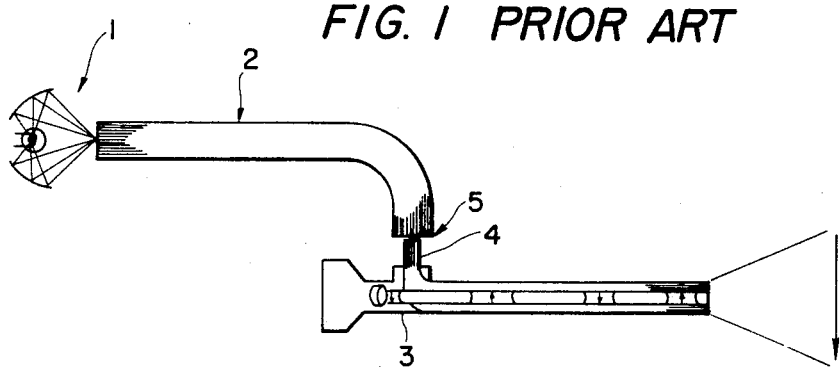
FIG. 1 shows a sectional view illustrating the composition of an endoscope.
Figure 2:
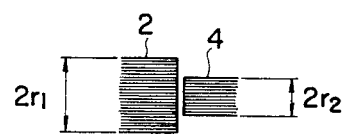
FIG. 2 and FIG. 3 show sectional views illustrating the connecting system of the conventional light guides in an illumination system of an endoscope.
Figure 3:
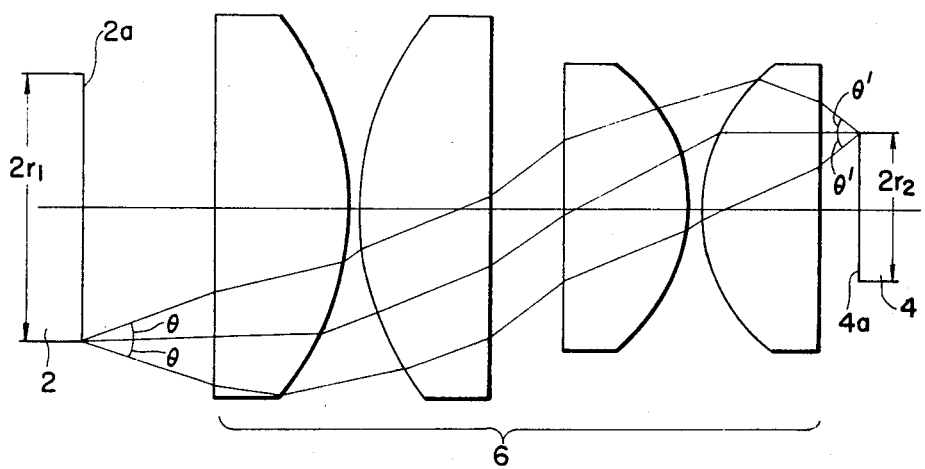
Figure 10:
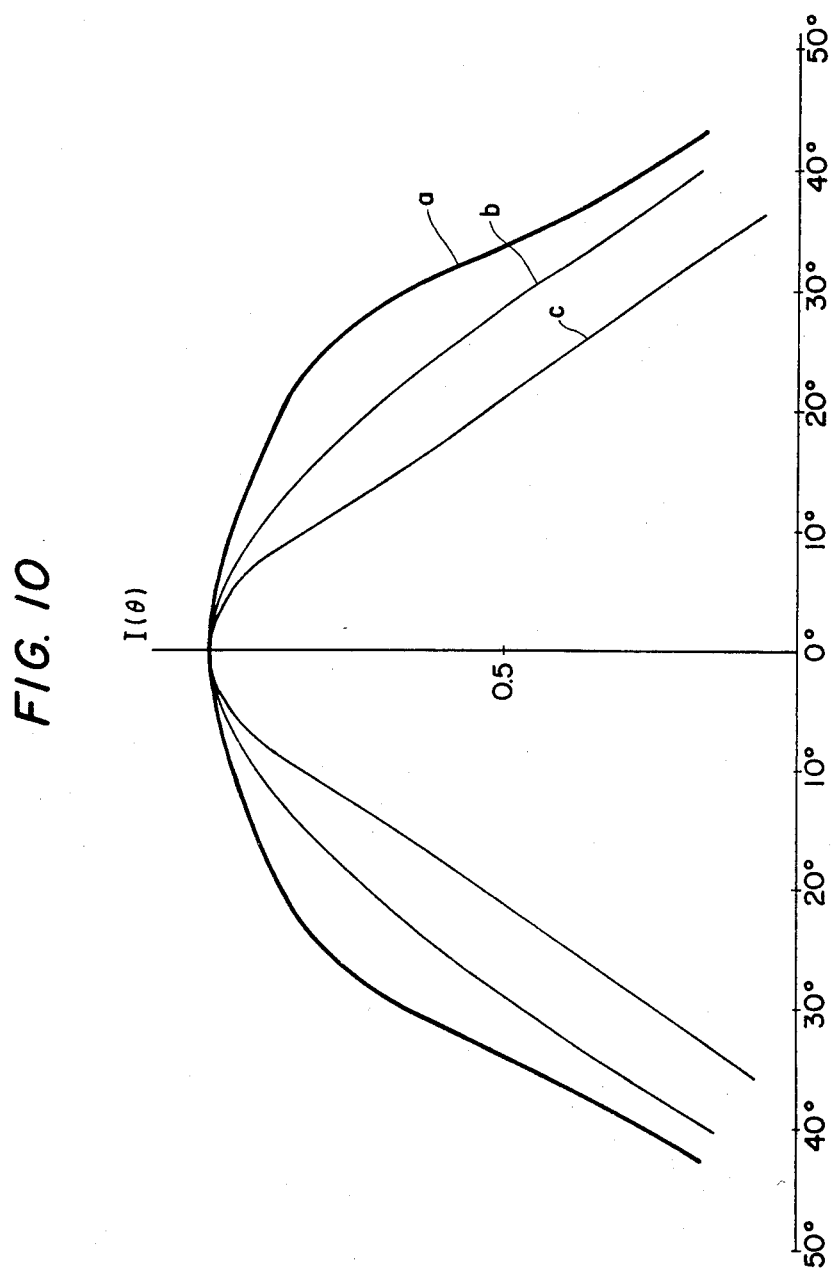
FIG. 10 shows curve illustrating the angular distribution characteristics which are traced based on values actually measured of the rays emerging from the light guides arranged on the object side in the optical system according to the present invention and those shown in FIG. 2 and FIG. 3.

Actual measured values of the angular distribution characteristic of the above-described embodiment are illustrated by the curve as shown in FIG. 10. As is clear from this curve, the intensity of a ray at an angle of about 40° on the emerging end surface of the light guide on the side of the object corresponds to ¼ of the peak intensity level. The present invention improves both the angular distribution characteristic and plane luminous intensity distribution as is understood by comparing this value with the curve c shown in FIG. 10 corresponding to the angular distribution characteristic of the system which directly connects two light guides and curve b which represent the angular distribution characteristic of the system using the lens system shown in FIG. 3 for projecting an image of the light source.

In the embodiment of the present invention described above, the emerging end surface of the light guide on the side of the light source and end surface of incidence of the light guide on the object side are not coincident with the front and rear focal points respectively of the lens system. Strictly speaking, the formula (3) does not establish and $r_2/r_1$ is different from $\sin\theta/\sin\theta'$ accordingly. Taking aberrations into consideration, however, locations of the respective end surfaces which are selected not at the focal points but in the vicinity thereof do not pose any problem in practice. Further, the emerging end surface of the light guide on the side of the light source and the end surface of incidence of the light guide on the object side may be located at any positions so far as the former end surface is located on the side of the lens system from the front focal point of the lens system and the latter end surface is located on the side of the lens system from the rear focal point of the lens system. Though flatness of the angular distribution characteristic is degraded at large angles (for example, the angles indicated by the reference symbol p in FIG. 9B will be deformed) in this case, such degradation will not constitute no problem in practice. Further, even if the emerging end surface of the light guide on the side of the light source is apart farther from the lens system than from the front focal point thereof or if the end surface of incidence of the light guide on the object side is farther from the lens system than from the rear focal point thereof, no practical problem will be posed though characteristic of the illumination light will be a little degraded. However, when both the end surfaces are arranged in such a way that rays from the emerging end surface of the light guide on the side of the light source are focused by the optical system onto the end surface of incidence of the light guide on the object side, i.e., when both the end surfaces are arranged on the two points which are conjugate with each other of said optical system, the connecting optical system according to the present invention will have the same arrangement as that of the conventional optical system shown in FIG. 3. Such an arrangement is not preferable since it degrades characteristic of the illumination light as already described in this patent specification. Therefore, characteristic of the illumination light will be favorable enough not to pose any practical problem so far as the emerging end surface of the light guide on the side of the lightsource and the end surface of incidence of the light guide on the object side are arranged inside the two points of the lens system which are conjugate with each other.

As is understood from the detailed descriptions set forth above, the connecting optical system according to the present invention provides the effects enumerated below:

(1) To make it possible to flatten the angular distribution characteristic of the rays incident on the light guide on the object side and widen the range of the distributed rays.

(2) To make it possible to increase quantity of illumination light though quantity of illumination light was limited by light loss in the conventional connecting system even when quantity of light incident on the light guide on the side of the light source was increased.

(3) To make it possible to increase energy of the light incident on the light guide on the object side.

(4) To make the merits of the connecting optical system according to the present invention more effective when said connecting optical system is applied to a dual-section type endoscope since the light guide on the object side is short.

Though the descriptions on the connecting optical system according to the present invention have been made taking a use with an illumination system for endoscopes as an example, said connecting optical system is applicable also to other types of illumination systems using light guides. Further, in addition to the use as a connecting optical system for light guides, the optical system according to the present invention is usable as a system for transferring rays from a primary light source (for example, a xenon lamp) having the plane luminous intensity distribution and angular distribution characteristic similar to those of the secondary light source on the emerging end surface of the light guide on the side of the light source to another light guide.

We claim:

1. An optical system for connecting light guides for endoscopes comprising a first light guide which is arranged on the side of the light source and functions to transmit rays from said light source, a second light guide which receives the rays transmitted through said first light guide and which emerge from the emerging end surface thereof, transmits said rays and allows said rays to emerge from the emerging end surface of said second light guides for illuminating an object, and a lens system arranged between said first and second light guides; the emerging end surface of said first light guide being arranged in the vicinity of the front focal point of said lens system, the incidence end surface of said second light guide being arranged in the vicinity of the rear focal point of said lens system with the diameter of the end surface of said first light guide being larger than that of the incidence end surface of said second light guide; and said optical system being so designed as to satisfy the following condition:

$$\frac{2r_1}{f} \geq 1$$

wherein the reference symbol $r_1$ represents radius of the emerging end surface of said first light guide and the reference symbol F designates focal length of said lens system.

* * * * *